(12) United States Patent
Motieian Najar et al.

(10) Patent No.: US 10,197,466 B2
(45) Date of Patent: Feb. 5, 2019

(54) METHODS AND APPARATUS TO CALIBRATE MICRO-ELECTROMECHANICAL SYSTEMS

(71) Applicant: TEXAS INSTRUMENTS INCORPORATED, Dallas, TX (US)

(72) Inventors: Mohammad Hadi Motieian Najar, Santa Clara, CA (US); Ira Oaktree Wygant, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 196 days.

(21) Appl. No.: 15/365,290

(22) Filed: Nov. 30, 2016

(65) Prior Publication Data

US 2018/0149541 A1  May 31, 2018

(51) Int. Cl.
*G01L 27/00* (2006.01)

(52) U.S. Cl.
CPC .................... *G01L 27/005* (2013.01)

(58) Field of Classification Search
CPC ....... G01L 27/005; G01L 27/00; G01L 19/04; G01L 9/06; G01D 18/008; G01D 3/022; G01D 3/08; G01D 18/00; F02D 41/222; A61B 5/02156; G01P 21/00; G01N 33/0006; G01N 27/4163; F15B 19/002
USPC .................. 702/98; 73/1.57, 1.01, 1.02, 1.59
See application file for complete search history.

(56) References Cited

U.S. PATENT DOCUMENTS

| | | | | |
|---|---|---|---|---|
| 4,951,236 A | * | 8/1990 | Kawate | G01L 9/0072 361/283.1 |
| 5,332,469 A | * | 7/1994 | Mastrangelo | B23P 15/00 216/13 |
| 5,471,882 A | | 12/1995 | Wiggins | |
| 6,314,544 B1 | * | 11/2001 | Rey | G01P 15/125 324/519 |

(Continued)

OTHER PUBLICATIONS

Cozma et al., Electrostatic actuation as a self-testing method for silicon pressure sensors, 1997, Katholieke Universiteit Leuven, Sensors and Actuators A 60, pp. 1-5.*

(Continued)

*Primary Examiner* — John Fitzgerald
*Assistant Examiner* — Truong D Phan
(74) *Attorney, Agent, or Firm* — Michael A. Davis, Jr.; Charles A. Brill; Frank D. Cimino

(57) ABSTRACT

Methods and apparatus to calibrate micro-electromechanical systems are disclosed. An example pressure sensor calibration apparatus includes a pressure chamber in which a first pressure sensor is to be disposed; one or more first sensors to determine a capacitance value from the first pressure sensor from a physical test performed on the first pressure sensor; the one or more first sensors to determine a first pull-in voltage value from a first electrical test performed on the first pressure sensor; a correlator to determine correlation coefficient values based on the capacitance value determined during the physical test on the first pressure sensor and the first pull-in voltage value determined during a first electrical test on the first pressure sensor; and a calibrator to determine calibration coefficient values to calibrate a second pressure sensor based on the correlation coefficient values and a second electrical test on the second pressure sensor.

20 Claims, 8 Drawing Sheets

(56) References Cited

U.S. PATENT DOCUMENTS

| | | | |
|---|---|---|---|
| 6,422,088 B1 | 7/2002 | Oba et al. | |
| 6,781,814 B1* | 8/2004 | Greene | G01L 9/0075 |
| | | | 361/283.1 |
| 6,862,525 B1 | 3/2005 | Beason et al. | |
| 2006/0161364 A1* | 7/2006 | Wang | G01L 9/0072 |
| | | | 702/98 |
| 2008/0074250 A1 | 3/2008 | Tsai | |
| 2012/0017703 A1* | 1/2012 | Ikebe | B25J 13/083 |
| | | | 73/862.626 |
| 2012/0073940 A1* | 3/2012 | Masunishi | H01G 5/18 |
| | | | 200/181 |
| 2013/0126994 A1 | 5/2013 | Hwang et al. | |
| 2013/0257456 A1* | 10/2013 | Liu | B81B 7/008 |
| | | | 324/658 |
| 2014/0253142 A1* | 9/2014 | Fink | G01R 31/04 |
| | | | 324/538 |
| 2014/0266263 A1* | 9/2014 | Wurzinger | G01R 27/2605 |
| | | | 324/686 |
| 2016/0018281 A1* | 1/2016 | Hammerschmidt | G01L 9/0073 |
| | | | 73/1.59 |

OTHER PUBLICATIONS

Marten Vranes, "Cost of MEMS Testing: A Strategic Perspective," 3rd Annual MTR Conference, Oct. 2011, MEMS Investor Journal, 44 pages.

Michael Gaitan, "Key Findings of iNEMI MEMS Roadmap," iNEMI MEMS Workshop, May 10, 2012, 24 pages.

* cited by examiner

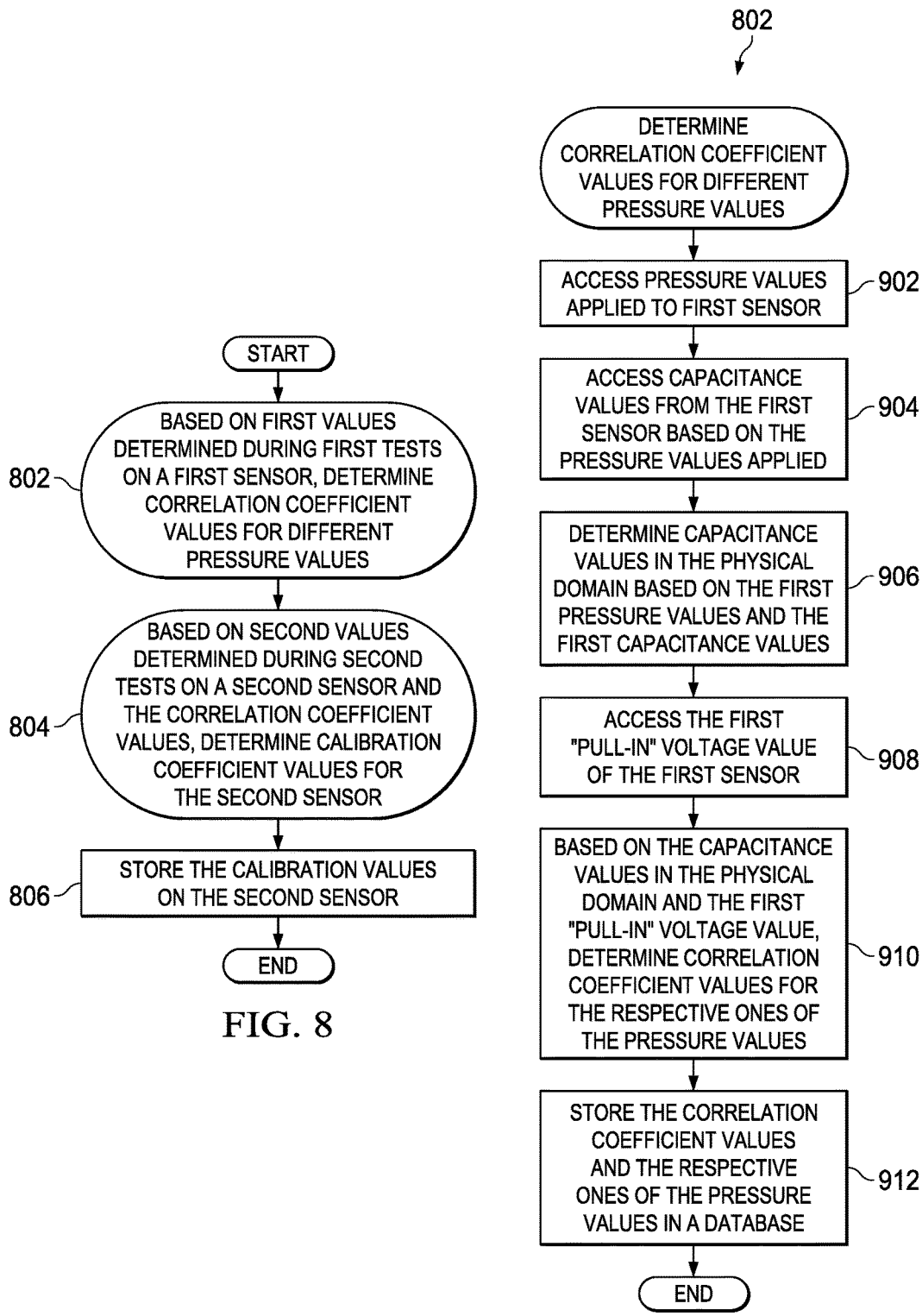

METHODS AND APPARATUS TO CALIBRATE MICRO-ELECTROMECHANICAL SYSTEMS

FIELD OF THE DISCLOSURE

This disclosure relates generally to micro-electromechanical systems, and, more particularly, to methods and apparatus to calibrate micro-electromechanical systems.

BACKGROUND

Micro-electromechanical systems (MEMS) such as, for example, pressure sensors are relatively nonlinear devices. Based on this nonlinearity and differences between the pressure sensors, typically, each pressure sensor is individually calibrated. Such an approach may increase the capital cost of equipment used to calibrate the pressure sensors and/or increase the time dedicated to calibrating each of the pressure sensors.

BRIEF DESCRIPTION OF THE DRAWINGS

FIG. 8 is a flow chart representative of machine readable instructions that may be executed to implement the example correlator and the example calibrator of FIGS. 1-4.

FIG. 9 is a flow chart representative of machine readable instructions that may be executed to implement the correlator of FIGS. 1 and 2 and to perform the processes of FIG. 8 to determine correlation coefficient values for different pressure values.

The figures are not to scale. Wherever possible, the same reference numbers will be used throughout the drawing(s) and accompanying written description to refer to the same or like parts.

DETAILED DESCRIPTION

Figure 1:
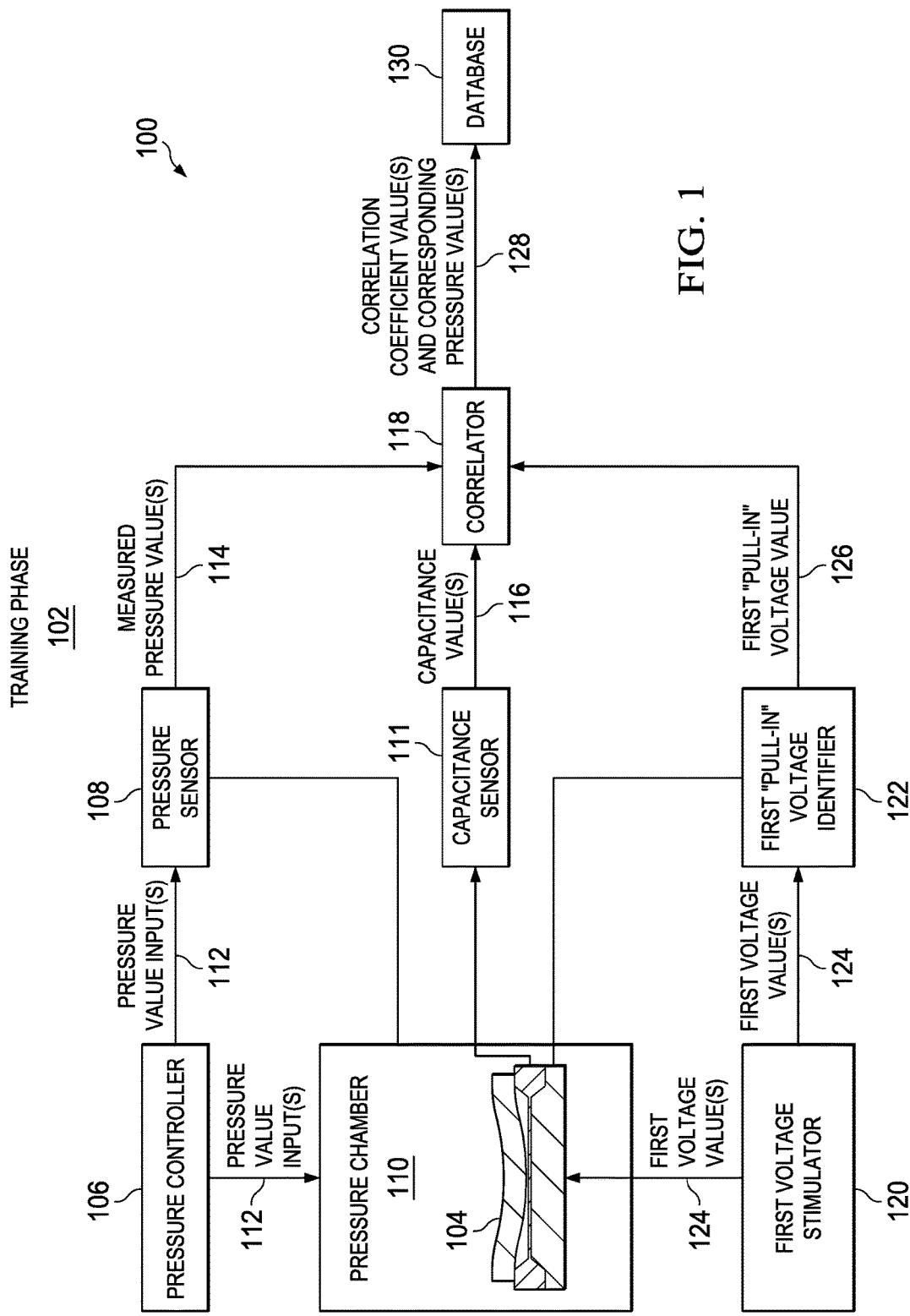
FIG. 1 is a schematic illustration of an example system used during an example testing phase to calibrate micro-electromechanical systems in accordance with the teachings of this disclosure.

The examples disclosed herein relate to calibrating micro-electromechanical systems (MEMS) such as, for example, pressure sensors and/or capacitive based barometric pressure sensors. Specifically, the examples disclosed herein relate to performing tests on first pressure sensors during a training phase and calibrating second pressure sensors during a testing phase using correlation coefficient values determined during the training phase. By taking such an approach, the examples disclosed herein enable the efficient calibration of a large quantity of pressure sensors based on calibration coefficient values determined by testing a lesser number of pressure sensors. As such, the examples disclosed herein avoid the time-consuming process of calibrating pressure sensors by performing a pressure sweep on each pressure sensor positioned in a pressure chamber.

In some examples, the training phase includes performing physical and electrical tests on the first pressure sensors. The physical test(s) may include exposing the first pressure sensors to various pressures (e.g., performing a pressure sweep) and determining the resultant capacitance value(s). In some examples, Equation 1 is used to relate the pressure and capacitance values determined during the physical test and/or is used to account for the capacitance of the first pressure sensor at ambient pressure, where $C_{p_x}$ corresponds to the capacitance at a particular pressure and $C_{p=1013hPa}$ corresponds to the capacitance at 1013 hectopascals (hPa).

$$f(C_p) = C_{p_x} - C_{p=1014hPa} \qquad \text{Equation 1:}$$

In some examples, the electrical test(s) includes applying various voltages (e.g., performing a voltage sweep) to the first pressure sensors and determining the pull-in voltage for the different pressure sensors. The voltages applied during the electrical test(s) may be direct current (DC) voltage. The pull-in voltage may be determined in various ways such as, for example, identifying a relatively significant capacitance increase as satisfying a threshold. As used herein, the pull-in voltage refers to the voltage beyond which it causes a diaphragm, plate and/or a membrane of a sensor to snap to the other plate-.

Based on the associated pressure and capacitance values and the pull-in voltages, in some examples, correlation coefficient values are determined using a polynomial function such as, for example, the second order polynomial function of Equation 2. Referring to Equation 2, $a_1$ corresponds to a first correlation coefficient, $a_2$ corresponds to a second correlation coefficient, $a_3$ corresponds to a third correlation coefficient, $f(C_p)$ corresponds to the capacitance in the physical domain and $f(V_{pi})$ corresponds to the pull-in voltage, where $f(V_{pi}) = V_{pi}$.

$$f(C_p) = a_1 f(V_{pi})^2 + a_2 f(V_{pi}) + a_3 \qquad \text{Equation 2:}$$

After the training phase, the testing phase may be performed. The testing phase may include performing electrical tests on second pressure sensors to determine the pull-in voltages for the different second pressure sensors. Based on the electrical tests performed on the second pressure sensors during the testing phase and the correlation coefficient values determined during the training phase, in some examples, capacitance values are determined for the second pressure sensors at different pressure values without performing the physical tests on the second pressure sensors. In some examples, Equation 3 is used to determine the capacitance value for a selected pressure value for the respective ones of the second pressure sensors.

$$C_{p_x} = a_1 f(V_{pi})^2 + a_2 f(V_{pi}) + a_3 + C_{p=1013hPa} \qquad \text{Equation 3:}$$

To extrapolate the capacitance and pressure values determined using equation 3, in some examples, a sensor equation fit is used such as, for example, the sensor equation fit of Equation 4. In some examples, the sensor equation fit uses Levenberg-Marquardt algorithm (LMA). Referring to Equation 4, $A_p$ refers to the plate area of the pressure sensor being calibrated in the testing phase, $\varepsilon_0$ corresponds to the permittivity of the free space within the pressure sensor being calibrated in the testing phase and $x_p$ corresponds to the peak plate displacement of the pressure sensor being calibrated in the testing phase as defined by Equation 5. Referring further to Equation 4, $g_0$ corresponds to the effective gap (e.g., 545.6 nanometers (nm)) of the pressure sensor being calibrated in the testing phase as defined by Equation 6, $\delta x_p$ corresponds to the displacement adjustment (e.g., zero offset) of the pressure sensor being calibrated in the testing phase and $C_{par}$ corresponds to the parasitic offset (e.g., 3.2 picofarads (pF)) of the pressure sensor being calibrated in the testing phase.

$$C = \frac{A_P \varepsilon_0 a\tanh\left(\sqrt{\frac{x_p + \delta x_p}{g_0}}\right)}{\sqrt{g_0(x_p + \delta x_p)}} + C_{par} \qquad \text{Equation 4}$$

Referring to Equation 5, a corresponds to the plate radius of the pressure sensor being calibrated in the testing phase and D corresponds to the flexural rigidity of the pressure sensor being calibrated in the testing phase as defined in Equation 7.

$$x_p = \frac{Pa^4}{64D} \qquad \text{Equation 5}$$

Referring to Equation 6, $g_{noox}$ corresponds to the air gap of the pressure sensor being calibrated in the testing phase, $t_{ox}$ corresponds to the thickness of the oxide of the pressure sensor being calibrated in the testing phase and $\varepsilon_{r,ox}$ corresponds to the relative permittivity of the oxide of the pressure sensor being calibrated in the testing phase.

$$g_0 = g_{noox} + \frac{t_{ox}}{\varepsilon_{r,ox}} \qquad \text{Equation 6}$$

Referring to Equation 7, E corresponds to Young's modulus, v corresponds to Poisson's ratio and t corresponds to the thickness of the plate (e.g., 8 micrometers($\mu$m)) and D is the flexural rigidity of the pressure sensor being calibrated in the testing phase.

$$D = \frac{Et^3}{12(1-v^2)} \qquad \text{Equation 7}$$

In some examples, to reduce the complexity of the solution, a polynomial fit (e.g., $5^{th}$ order polynomial) is performed on the squared inverted results of the sensor equation fit using, for example, Equation 8. Referring to Equation 8, C corresponds to the capacitance determined using Equation 4, $a_i$ corresponds to the polynomial coefficients and $\hat{P}$ corresponds to the pressure result vector from the polynomial fit. In some examples, the polynomial fit performed is a $5^{th}$ order polynomial fit and the output includes calibration coefficient values to calibrate the second pressure sensors.

$$\hat{P}(C) = \sum_{i=1}^{n+1} a_i \left(\frac{1}{C - C_{par}}\right)^{2(n-i+1)} \qquad \text{Equation 8}$$

FIG. 1 illustrates an example calibration system 100 that can be used to calibrate micro-electromechanical systems (MEMS) including pressure sensors in a cost effective and efficient manner. In the illustrated example, the calibration system 100 includes an example training phase 102 that performs physical and electrical tests on a first pressure sensor 104 and uses the results of the physical and electrical tests to determine correlation coefficient values. While the illustrated example depicts one pressure sensor (i.e., the first pressure sensor 104) in the training phase 102, in other examples, any number of pressure sensors may be used during the training phase 102.

To enable the physical tests to be performed on the first pressure sensor 104 during the training phase 102, in the illustrated example, the calibration system 100 includes an example pressure controller 106, an example pressure gauge and/or sensor 108, an example pressure chamber 110 in which the first pressure sensor 104 is disposed and an example capacitance sensor 111. In some examples, to perform the physical tests on the first pressure sensor 104, the pressure controller 106 sets a pressure within the pressure chamber 110 via a pressure value input 112 and the pressure gauge 108 measures the actual pressure within the pressure chamber 110 to enable a determination to be made as to whether the pressure within the pressure chamber 110 has stabilized and/or whether the pressure value input 112 and a measured pressure 114 are within a threshold of one another.

In some examples, when the pressure within the pressure chamber 110 stabilizes and/or when the pressure value input 112 and the measured pressure 114 are within a threshold of one another, the capacitance sensor 111 measures a capacitance value(s) 116 from the first pressure sensor 104 based on the pressure applied. In some examples, results 500 of the physical tests conducted during the training phase 102 are plotted on a graph 502 depicted in FIG. 5 where an x-axis 504 represents pressure and a y-axis 506 represents capacitance.

Referring back to the example of FIG. 1, the pressure gauge 108 and/or the capacitance sensor 111 provide or otherwise enable an example correlator 118 to access the measured pressure value(s) 114 and the capacitance value(s) 116 for further processing. In this manner, in some examples, during the training phase 102, the first pressure sensor 104 is exposed to a range of pressures by performing a pressure sweep on the first pressure sensor 104 and measuring the resultant capacitance values 116 from the first pressure sensor 104 using the capacitance sensor 111. As used herein, the phrase "pressure sweep" refers to exposing a pressure sensor to a plurality of pressure values that may be incrementally or otherwise spaced from one another between a first pressure value (e.g., 600 hPa) and a second pressure value (e.g., 1013 hPa).

To enable the electrical tests to be performed during the training phase 102, in the illustrated example, the calibration system 100 includes an example first voltage stimulator 120 and an example first "pull-in" voltage identifier 122. While the illustrated example of FIG. 1 depicts the first pressure sensor 104 within the pressure chamber 110 when the electrical tests are being conducted, the electrical tests may be performed when the first pressure sensor 104 is disposed outside of the pressure chamber 110. In other words, the physical tests of the training phase 102 may be performed with the first pressure sensor 104 disposed within the pressure chamber 110 and the electrical tests of the training phase 102 may be performed with the first pressure sensor 104 disposed inside or outside of the pressure chamber 110.

In some examples, the electrical tests include the first voltage stimulator 120 applying a first voltage value 124 to and/or across the first pressure sensor 104 and the first "pull in" voltage identifier 122 measuring the resultant capacitance value(s) 116 based on the voltage(s) applied. In some examples, the first "pull in" voltage identifier 122 determines when, for example, a capacitance value change satisfies a threshold and/or indicates that a first "pull-in" voltage value 126 has been achieved. In some examples, results 600 of the electrical tests are plotted on a graph 602 depicted in FIG. 6 where an x-axis 604 represents voltage and a y-axis 606 represents capacitance and the increase in capacitance at reference number 608 is indicative of the pull-in voltage.

Figure 7:
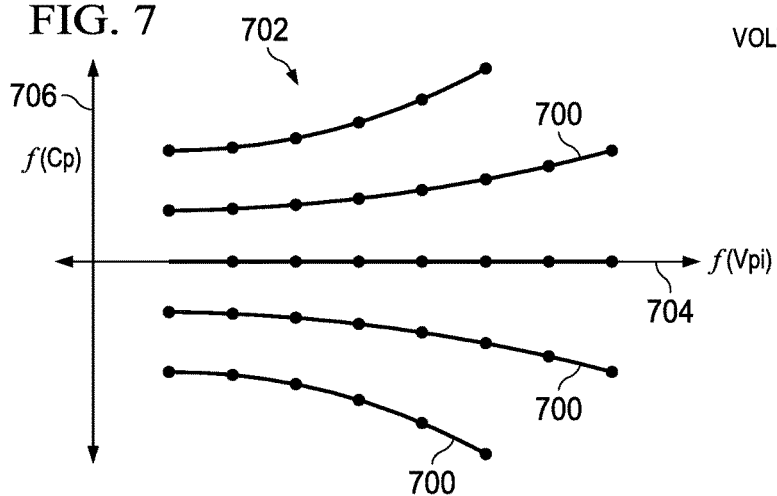
FIG. 7 is an example graph of correlation curves generated based on results obtained using the examples disclosed herein.

Referring back to the example of FIG. 1, the first voltage stimulator 120 and/or the first "pull-in" voltage identifier 122 provide or otherwise enable the correlator 118 to access the first "pull-in" voltage value 126 for further processing and/or to determine correlation coefficient values 128 used when calibrating other pressure sensors. In some examples, the correlation coefficient value(s) 128 are determined for the different pressures by the correlator 118 based on the measured pressure values 114, the capacitance values 116 and the first "pull-in" voltage value 126 by generating correlation curves using, for example, a second order polynomial function such as, Equation 2 above. In some examples, correlation curves 700 generated by the correlator 118 are plotted on a graph 702 as depicted in FIG. 7 where an x-axis 704 represents the pull in voltage in the electrical domain $f(V_{pi})$ and a y-axis 706 represents the capacitance in the physical domain, $f(C_p)$. As shown in the example of FIG. 1, the correlation coefficient value(s) and corresponding pressure value(s) 128 are provided to a database 130 for storage.

Figure 2:
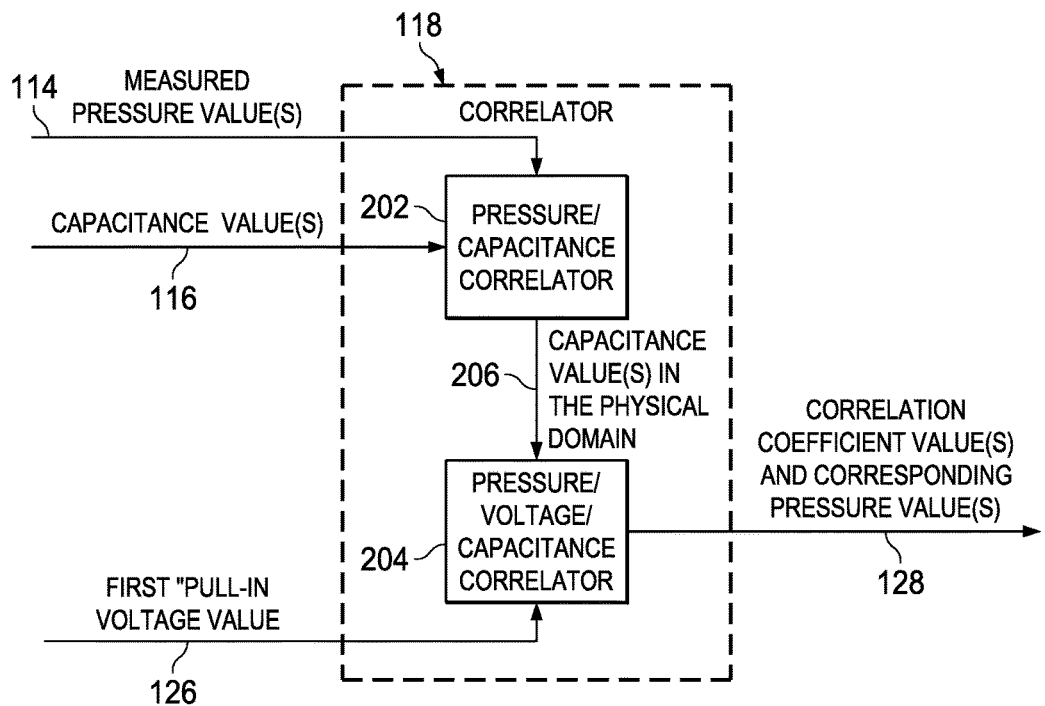
FIG. 2 is a schematic illustration of the example correlator of FIG. 1.

FIG. 2 illustrates an example implementation of the correlator 118 of FIG. 1. In the illustrated example, the correlator 118 includes an example pressure/capacitance correlator 202 and an example pressure/voltage/capacitance correlator 204.

In the illustrated example, to process the measured pressure values 114 and the capacitance values 116 associated with the physical tests of the training phase 102, the pressure/capacitance correlator 202 receives and/or accesses the measured pressure values 114 and the capacitance values 116 and determines capacitance values 206 in the physical domain, $f(C_p)$, using for example, Equation 1. In some examples, the capacitance values 206 in the physical domain, $f(C_p)$, account for the capacitance (e.g., $C_{p=1013hPa}$) of the first pressure sensor 104 at ambient pressure.

In the illustrated example, to determine the correlation coefficient values 128 used to calibrate other pressure sensors, the pressure/voltage/capacitance correlator 204 receives and/or accesses the capacitance values 206 in the physical domain, $f(C_p)$, and the first "pull-in" voltage 126 and determines the correlation coefficient values 128 for each of the pressure values having a corresponding capacitance value 206 in the physical domain, $f(C_p)$, using, for example, Equation 2. In some examples, to associate the correlation coefficient values 128 with a corresponding pressure value, the pressure/voltage/capacitance correlator 204 generates a look-up table in which the correlation coefficient values 128 (e.g., $a_1$, $a_2$, $a_3$) are associated with a respective pressure value (e.g., $P_1$, $P_2$, $P_3$, etc.).

Figure 3:
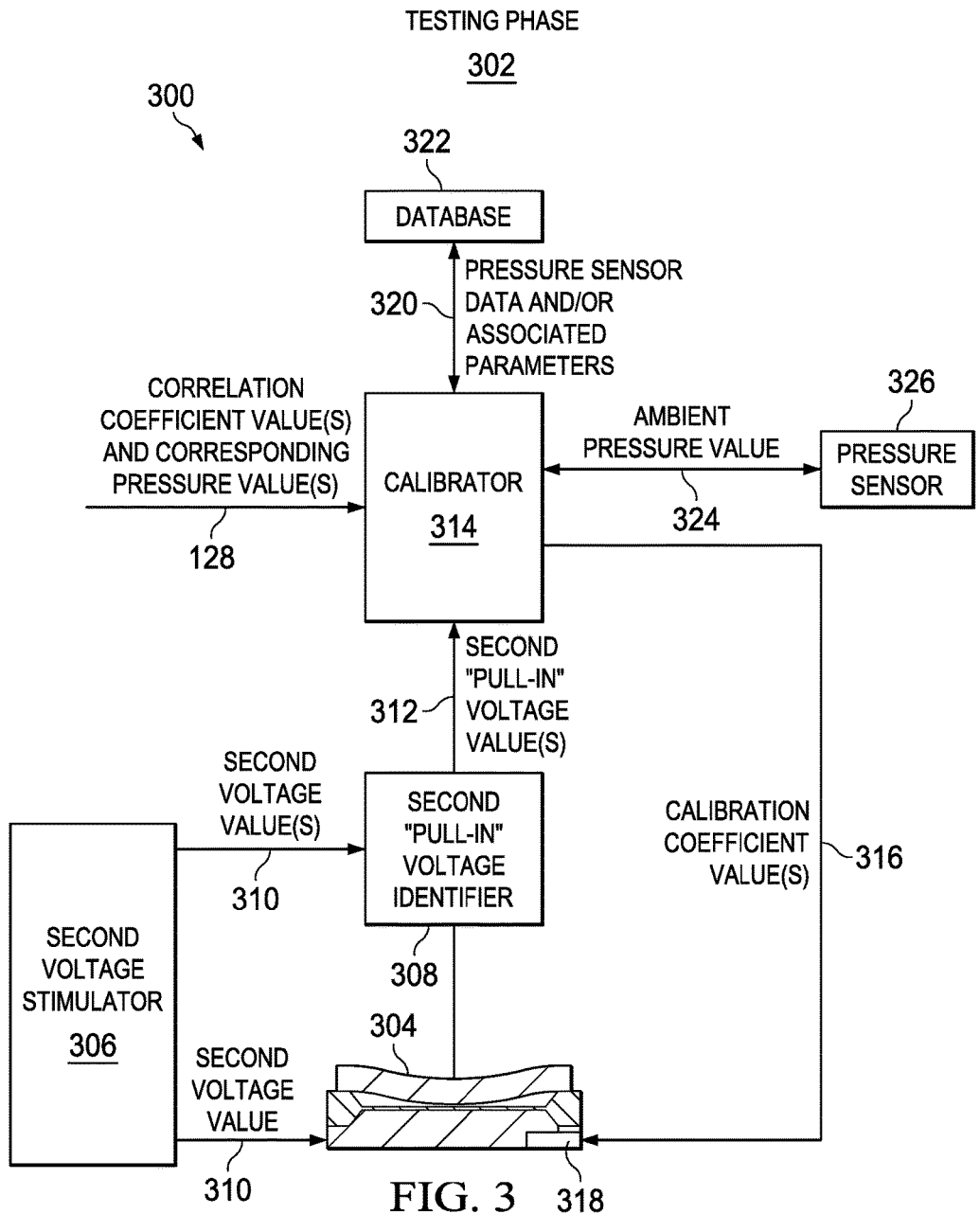
FIG. 3 is a schematic illustration of an example system used during an example testing phase to calibrate micro-electromechanical systems in accordance with the teachings of this disclosure.

FIG. 3 illustrates an example calibration system 300 that can be used to calibrate micro-electromechanical systems (MEMS) including pressure sensors in a cost effective and efficient manner. In the illustrated example, the calibration system 300 includes an example testing phase 302 that calibrates a second pressure sensor 304 using the determined correlation coefficient values 128 and the results of electrical tests conducted on the second pressure sensor 304. While the illustrated example depicts one pressure sensor (i.e., the second pressure sensor 304) in the testing phase, in other examples, any number of pressure sensors may be used during the testing phase 302.

To enable the electrical test(s) to be performed during the testing phase 302, in the illustrated example, the example calibration system 100 includes an example second voltage stimulator 306 and an example second "pull-in" voltage identifier 308. In some examples, the electrical tests include the second voltage stimulator 306 applying second voltage values 310 to and/or across the second pressure sensor 304 and the second "pull-in" voltage identifier 308 measuring the resultant capacitance value(s) based on the voltage(s) applied. In some examples, the second "pull-in" voltage identifier 308 determines when, for example, a capacitance value change satisfies a threshold and/or indicates that a second "pull-in" voltage value 312 has been achieved.

In the illustrated example, the second voltage stimulator 306 and the second "pull-in" voltage identifier 308 provide or otherwise enable an example calibrator 314 to access the second "pull-in" voltage value(s) 312 for further processing. In some examples, the further processing includes the calibrator 314 determining calibration coefficient values 316 that can be used to calibrate the second pressure sensor 304 and/or stored on a data store 318 of the second pressure sensor 304. The calibration values 316 may be determined based on the electrical tests performed on the second pressure sensor 304, the correlation coefficient value(s) 128 from the correlator 118, pressure sensor data and/or associated parameters 320 from a database 322 and/or an ambient pressure value(s) 324 measured by a pressure gauge and/or sensor 326.

In some examples, the pressure sensor data and/or associated parameters 320 include, for example, a plate area of the second pressure sensor 304, $A_p$, a plate radius of the second pressure sensor 304, a, a permittivity of the free space within the second pressure sensor 304, $\varepsilon_0$, a relative permittivity of an oxide of the second pressure sensor 304, $\varepsilon_{r,ox}$ and/or a peak plate displacement of the second pressure sensor 304, $x_p$. Additionally and/or alternatively, in some examples, the pressure sensor data and/or associated parameters 320 include, for example, a displacement adjustment of the second pressure sensor 304, $\delta x_p$, an effective gap of the second pressure sensor 304, $g_0$, an air gap of the second pressure sensor 304, $g_{nox}$, a thickness of the oxide of the second pressure sensor 304, $t_{ox}$, a parasitic offset of the second pressure sensor 304, $C_{par}$, flexural rigidity of the second pressure sensor 304, D, Young's modulus, E and/or Poisson's ratio, v.

Figure 4:
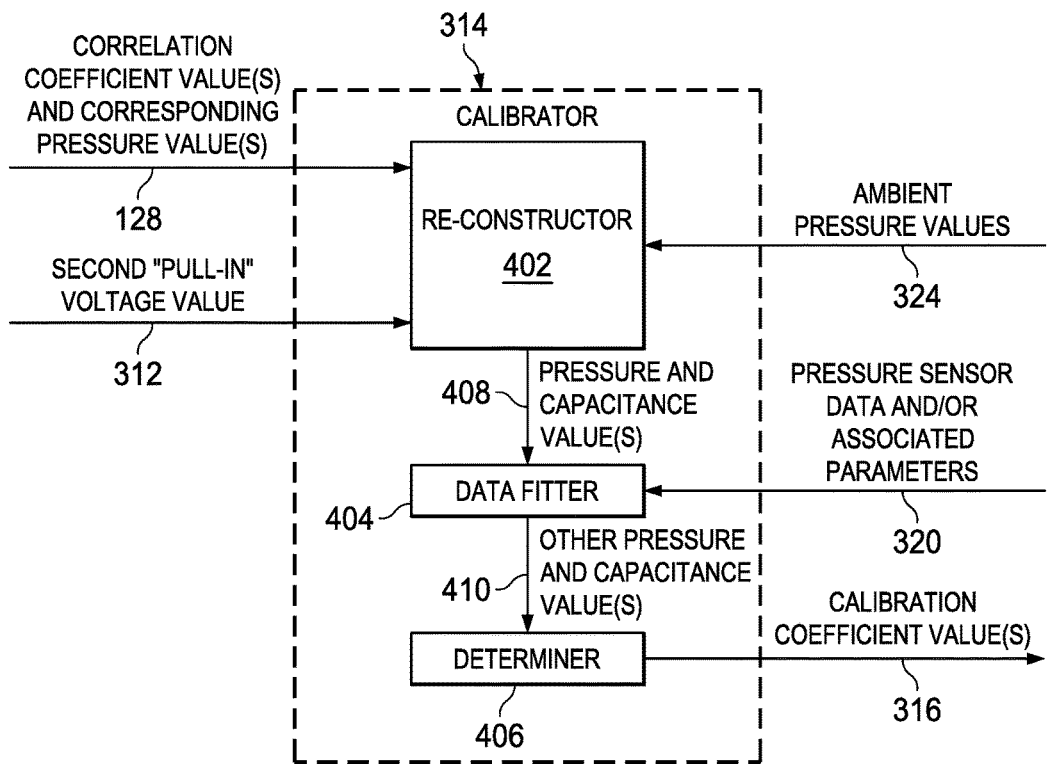
FIG. 4 is a schematic illustration of an example implementation of the example calibrator of FIG. 3.

FIG. 4 illustrates an example implementation of the calibrator 314 of FIG. 3. In the illustrated example, the calibrator 314 includes an example re-constructor 402, an example data fitter 404 and an example determiner 406. In the illustrated example, to determine the resultant capacitance values when the second pressure sensor 304 is exposed to different pressures without actually performing physical tests on the second pressure sensor 304, the re-constructor 402 accesses and/or receives the correlation coefficient values 128 and corresponding pressure values, the second "pull-in" voltage value 312 and the ambient pressure value 324 and predicts resultant capacitances 408 that the second pressure sensor 304 would generate if the second pressure sensor 304 were actually exposed to different pressures using Equation 2. In some examples, the re-constructor 402 uses Equation 2 to predict the capacitance that the second pressure sensor 304 would generate if the second pressure sensor 304 were actually exposed to different pressures. Thus, by selecting the correlation coefficient values 128 associated with a respective pressure, the example re-constructor 402 can predict the capacitance values in the physical domain for the second pressure sensor 304 without actually performing physical tests on the second pressure sensor 304.

To determine other and/or extrapolate capacitance and pressure values 408 determined by the re-constructor 402, in the illustrated example, the data fitter 404 accesses the pressure sensor data and/or associated parameters 320 and the pressure and capacitance values 408 and determines other and/or extrapolates and/or fits the pressure and capacitance values 410 using the sensor equation fit of Equation 4 and the places the data in a simpler form using the $5^{th}$ order polynomial fit equation of Equation 8.

To determine the calibration coefficient values 316 to be used to calibrate the second pressure sensor 304, the determiner 406 accesses the other pressure and capacitance values 410 from the data fitter 404 and processes the other pressure and capacitance values 410 to determine the calibration coefficient values 316. Thus, using the examples disclosed herein, the example correlator 118 determines the correlation coefficient values 128 by performing physical and electrical tests on the first pressure sensor 104 and the example calibrator 314 determines the calibration coefficient values 316 based on the correlation coefficient values 128 and electrical tests performed on the second pressure sensor 304. In some examples, these calibration coefficient values 316 are stored in a memory to be later used to calibrate each sensor individually.

While an example manner of implementing the example correlator 118 of FIG. 1 is illustrated in FIG. 2 and an example of implementing the example calibrator 314 of FIG. 3 is illustrated in FIG. 4, one or more of the elements, processes and/or devices illustrated in FIGS. 2 and/or 2 may be combined, divided, re-arranged, omitted, eliminated and/or implemented in any other way. Further, the example pressure/capacitance correlator 202, the example pressure/voltage/capacitance correlator 204, the example correlator 118, the example re-constructor 402, the example data fitter 404, the example determiner 406 and/or the example calibrator 314 of FIGS. 2 and/or 4 may be implemented by hardware, software, firmware and/or any combination of hardware, software and/or firmware. Thus, for example, any of the example pressure/capacitance correlator 202, the example pressure/voltage/capacitance correlator 204, the example correlator 118, the example re-constructor 402, the example data fitter 404, the example determiner 406 and/or the example calibrator 314 of FIGS. 2 and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pressure/capacitance correlator 202, the example pressure/ voltage/capacitance correlator 204, the example correlator 118, the example re-constructor 402, the example data fitter 404, the example determiner 406 and/or the example calibrator 314 is/are hereby expressly defined to include a tangible computer readable storage device or storage disk such as a memory, a digital versatile disk (DVD), a compact disk (CD), a Blu-ray disk, etc. storing the software and/or firmware. Further still, the example correlator 118 of FIG. 1 may include one or more elements, processes and/or devices in addition to, or instead of, those illustrated in FIG. 2, and/or may include more than one of any or all of the illustrated elements, processes and devices.

Figure 5:
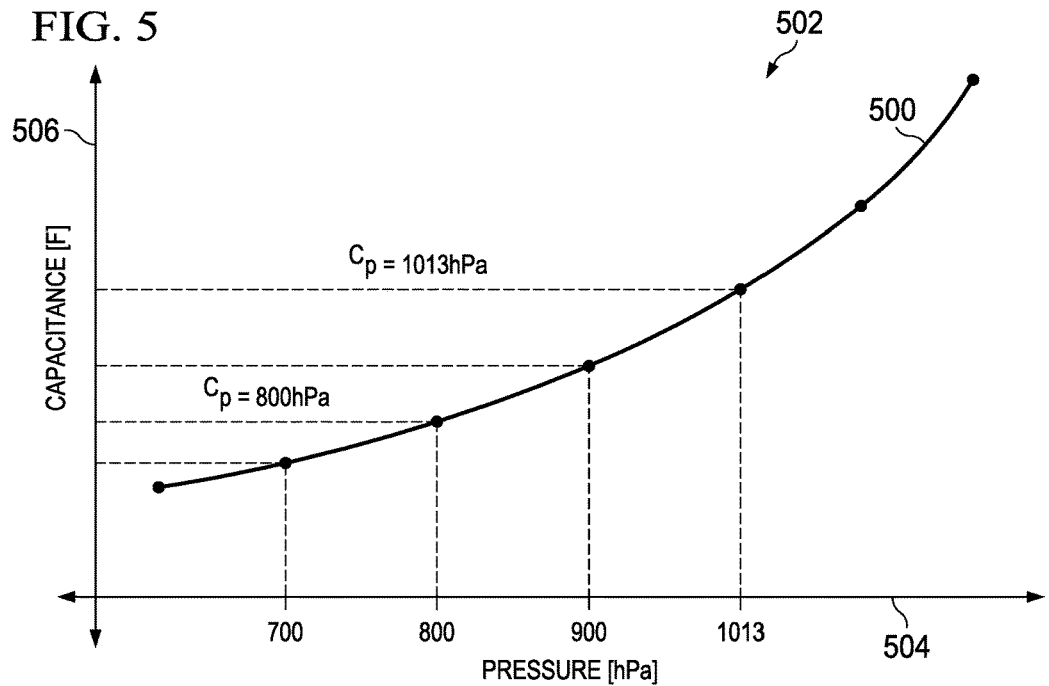
FIG. 5 is an example graph of capacitance versus pressure illustrating results obtained using the examples disclosed herein.

FIG. 5 illustrates the example graph 502 including resultant capacitances of the first pressure sensor 104 being exposed to different pressures during the training phase 102 and/or predicted capacitance/pressure combinations for the second pressure sensor 304 in the testing phase 302. The graph 502 of FIG. 5 includes the x-axis 504 that represents pressure and the y-axis 506 that represents capacitance.

Figure 6:
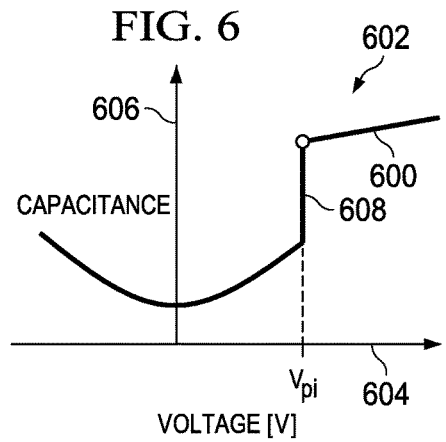
FIG. 6 is an example graph of capacitance versus voltage illustrating results obtained using the examples disclosed herein.

FIG. 6 illustrates the example graph 602 including resultant capacitances of the first pressure sensor 104 being exposed to different voltages during the training phase 102 and/or predicted capacitance/voltage combinations for the second pressure sensor 304 in the testing phase 302. The graph 602 of FIG. 6 includes the x-axis 604 that represents voltage and the y-axis 606 that represents capacitance.

FIG. 7 illustrates the example graph 702 including the correlation curves 700 generated using Equation 3 where the x-axis 704 represents the capacitance in the electrical domain $f(C_{pi})$ and the y-axis 706 represents the capacitance in the physical domain, $f(C_p)$.

Figure 10:
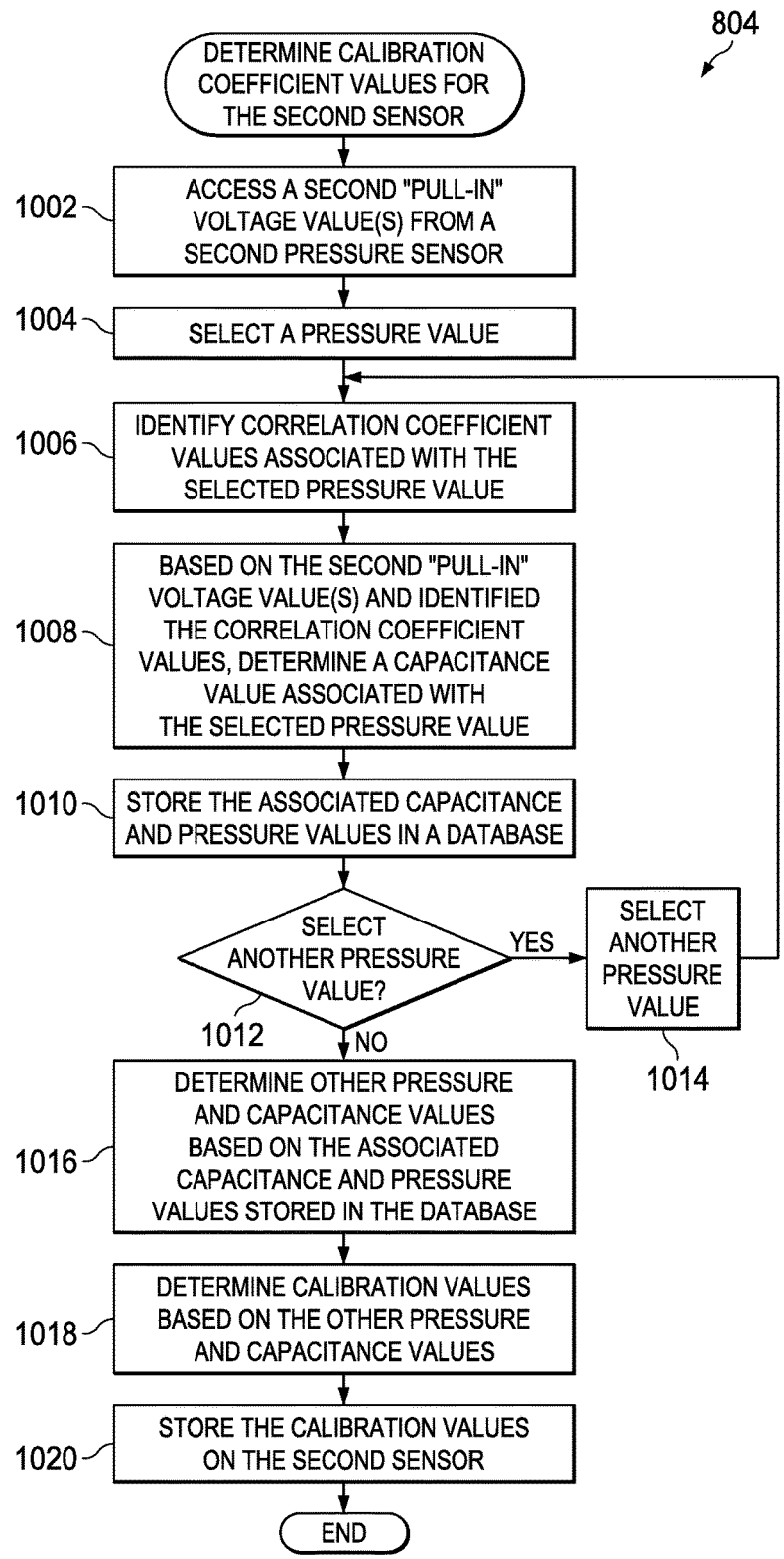
FIG. 10 is a flow chart representative of machine readable instructions that may be executed to implement the calibrator of FIGS. 3 and 4 and to perform the processes of FIG. 8 to determine calibration coefficient values for a second sensor.
Figure 11:
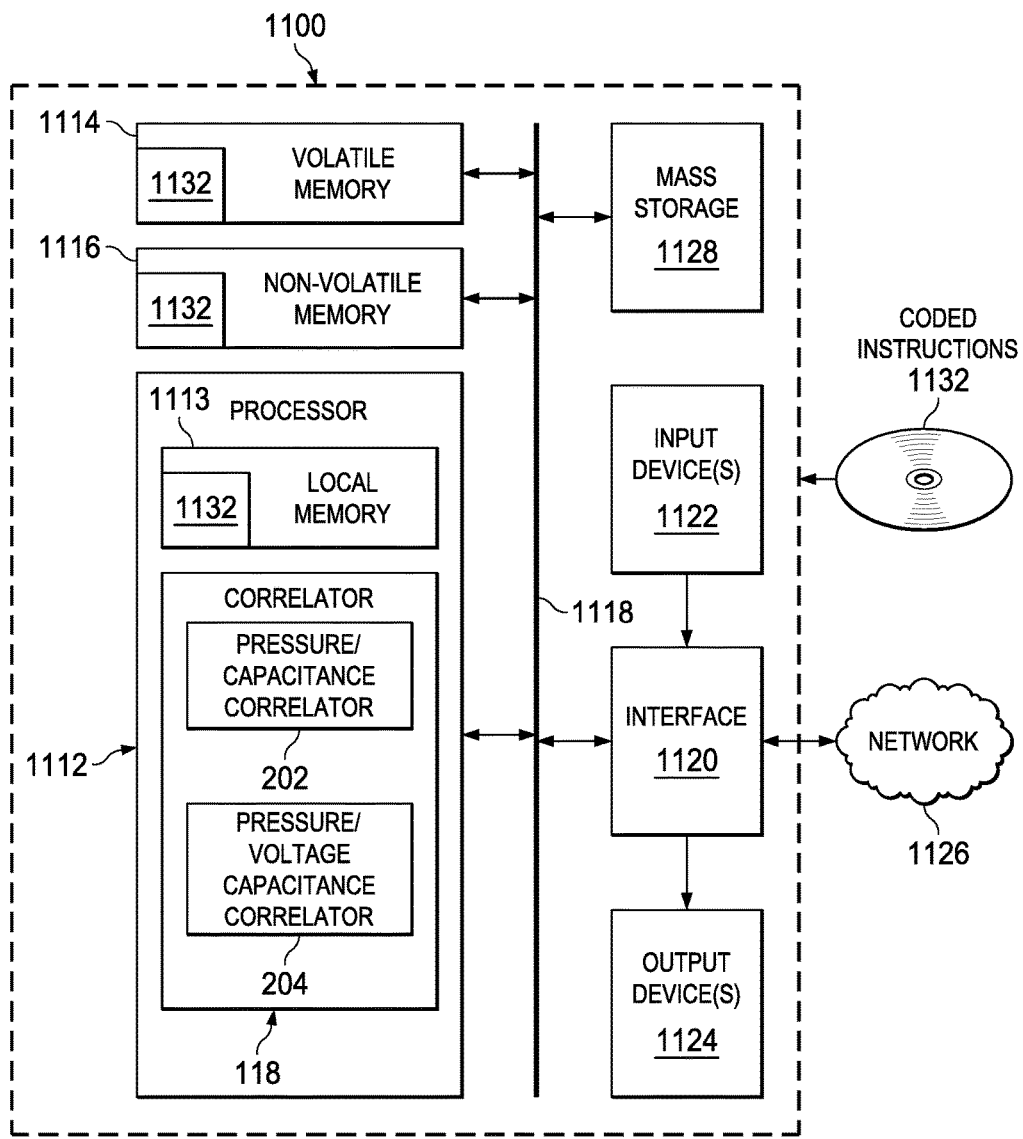
FIGS. 11 and 12 illustrate processor platforms which may execute the instructions of FIGS. 8-10 to implement the example correlator and the example calibrator of FIGS. 1-4.
Figure 12:
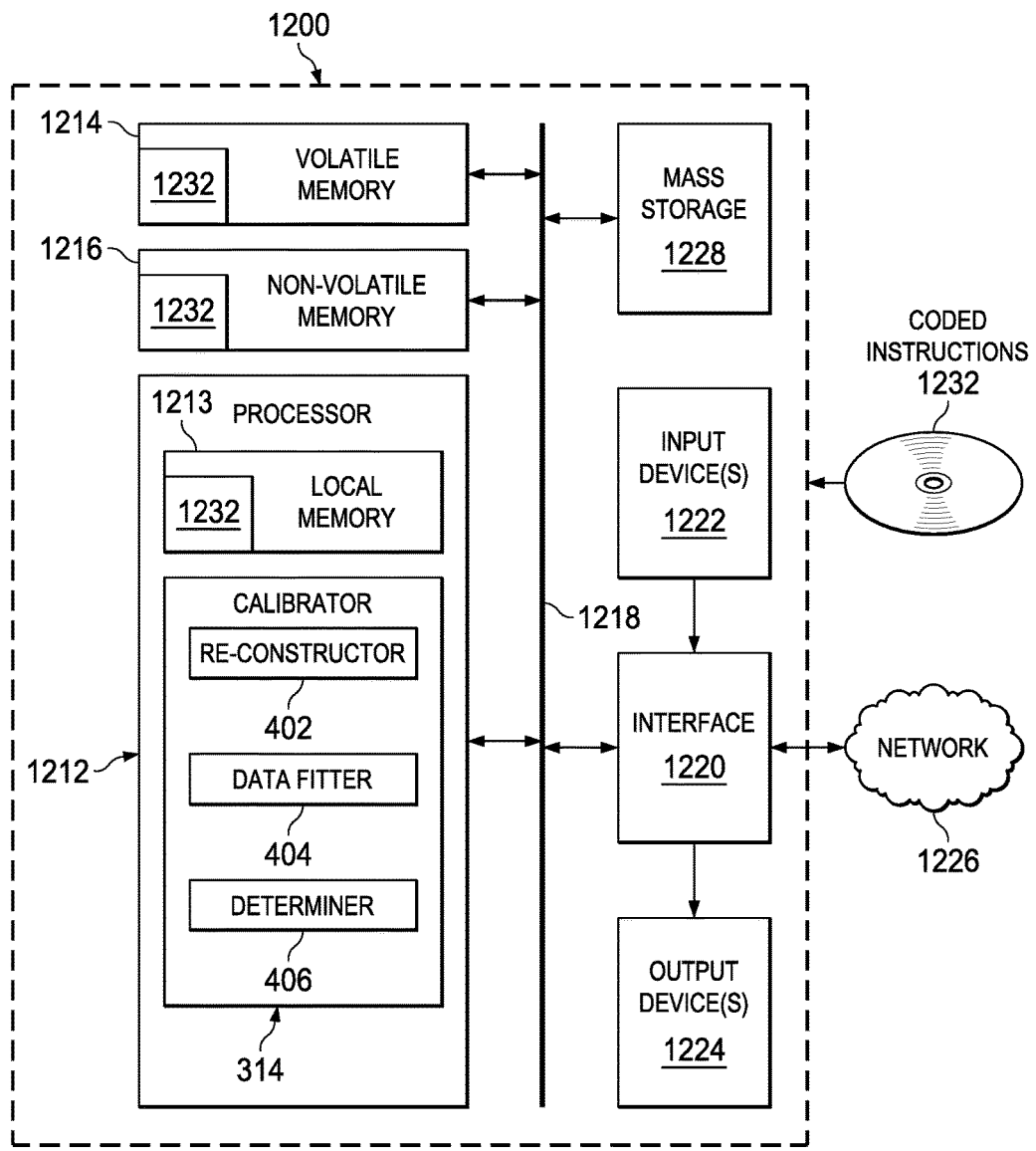

Flowcharts representative of example machine readable instructions for implementing the example correlator 118 and the example calibrator 314 of FIGS. 1-4 is shown in FIGS. 8-10. In this example, the machine readable instructions comprise a program for execution by a processor such as the processors 1112, 1212 shown in the example processor platform 1100, 1200 discussed below in connection with FIGS. 11, 12. The program may be embodied in software stored on a tangible computer readable storage medium such as a CD-ROM, a floppy disk, a hard drive, a digital versatile disk (DVD), a Blu-ray disk, or a memory associated with the processors 1112, 1212, but the entire program and/or parts thereof could alternatively be executed by a device other than the processor 1111, 1212 and/or embodied in firmware or dedicated hardware. Further, although the example program is described with reference to the flowchart illustrated in FIGS. 8-10, many other methods of implementing the example correlator 118 and the example calibrator 314 may alternatively be used. For example, the order of execution of the blocks may be changed, and/or some of the blocks described may be changed, eliminated, or combined.

As mentioned above, the example processes of FIGS. 8-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 8 begins with the correlator 118 determining the correlation coefficient values 128 for different pressure values (block 802). In some examples, the correlation coefficient values 128 are determined based on first values 114, 116, 126 determined during first tests on the first sensor 104. The calibrator 314 determines the calibration coefficient values 316 to be used to calibrate the second sensor 304 (block 804). In some examples, the calibration coefficient values 316 are determined based on second values 312, 320, 324 and the correlation coefficient values 128. The calibration coefficient values 316 are stored on the second pressure sensor 304 (block 806).

FIG. 9 illustrates an example of performing the processes of block 802 to determine the correlation coefficient values 128. The program of FIG. 9 begins with the pressure/capacitance correlator 202 of the correlator 118 accessing the measured pressure values 114 (block 902) and accessing the capacitance values 116 (block 904) from the physical tests performed on the first pressure sensor 104 during the training phase 102. The pressure/capacitance correlator 202 processes the pressure values 114 and the capacitance values 116 using, for example, Equation 1, to determine the capacitance values 206 in the physical domain, $f(C_p)$ (block 906).

The pressure/voltage/capacitance correlator 204 of the correlator 118 accesses the first "pull-in" voltage value 126 (block 908). The pressure/voltage/capacitance correlator 204 processes the capacitance values 206 in the physical domain, $f(C_p)$ and the first "pull-in" voltage value 126 to determine the correlation coefficient values 128 for each of the pressure values having a corresponding capacitance value 206 in the physical domain, $f(C_p)$, using, for example, Equation 2 (block 910). The database 130 stores the correlation coefficient values 128 and the associated values in the database 130 (block 912). The process then returns to FIG. 8.

FIG. 10 illustrates an example of performing the processes of block 804 to determine the calibration coefficient values 316 for the second sensor 304. The program of FIG. 10 begins with the re-constructor 402 of the calibrator 314 accessing the second "pull-in" voltage 312 (block 1002) from the electrical tests performed on the second pressure sensor 304. The re-constructor 402 selects a pressure value to predict the resultant capacitance value of the second pressure sensor 304 if the second pressure sensor 304 were actually physically exposed to the pressure (block 1004). The re-constructor 402 selects the associated correlation coefficient values 128 associated with the selected pressure from, for example, a look-up table generated by the pressure/voltage/capacitance correlator 204 (block 1006).

To predict the resultant capacitance values in the physical domain for the second pressure sensor 304, the re-constructor 402 processes the correlation coefficient values 128 for the selected pressure, the second "pull-in" voltage value 312 and/or the ambient pressure value 324 and determines the capacitance value 408 for the selected pressure (block 1008). The database 322 stores the associated pressure and capacitance values 408 in the database 322 (block 1010). If another pressure is selected at block 1012, control advances to block 1014.

However, if another pressure is not selected at block 1012, the data fitter 404 accesses the pressure and capacitance values 408 and/or the pressure sensor data and/or associated parameters 320 and determines other and/or extrapolates and/or fits the pressure and capacitance values 410 using an example sensor equation fit and/or places the data in a simpler form using an example $5^{th}$ order polynomial fit equation (block 1016).

The determiner 406 determines the calibration coefficient values 316 to be used to calibrate the second pressure sensor 304 by processing the other pressure and capacitance values 410 (block 1018). The process then returns to FIG. 8.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In this example, the processor 1112 implements the example pressure/capacitance correlator 202, the example first voltage/capacitance correlator 204 and the example correlator 118.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED)). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. FIGS. 8-10 may be stored in the mass storage device 1128, in the volatile memory 1114, in the non-volatile memory 1116, and/or on a removable tangible computer readable storage medium such as a CD or DVD.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In this example, the processor 1212 implements the example re-constructor 402, the example data fitter 404, the example determiner 406 and the example calibrator 314.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED)). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. FIGS. 8-10 may be stored in the mass storage device 1228, in the volatile memory 1214, in the non-volatile memory 1216, and/or on a removable tangible computer readable storage medium such as a CD or DVD.

From the foregoing, it will appreciate that the above disclosed methods, apparatus and articles of manufacture relate to calibrating micro-electromechanical systems (MEMS) such as, for example, pressure sensors and/or capacitive based barometric pressure sensors. Specifically, the examples disclosed herein relate to performing tests on first pressure sensors during a training phase and calibrating second pressure sensors during a testing phase using correlation coefficient values determined during the training phase. By taking such an approach, the examples disclosed herein enable the efficient calibration of a large quantity of pressure sensors based on calibration coefficient values determined by testing a lesser number of pressure sensors.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pressure sensor calibration apparatus, comprising:
a correlator to determine correlation coefficient values based on a capacitance value determined during a physical test on a first pressure sensor and a first pull-in voltage value determined during a first electrical test on the first pressure sensor, the physical test including exposing the first pressure sensor to a first pressure and determining the capacitance value based on the first pressure applied, the first electrical test including exposing the first pressure sensor to voltages and determining the first pull-in voltage value; and
a calibrator to determine calibration coefficient values to calibrate a second pressure sensor based on the correlation coefficient values and a second electrical test on the second pressure sensor.

2. The pressure sensor calibration apparatus of claim 1, wherein the second electrical test includes exposing the second pressure sensor to voltages and determining a second pull-in voltage of the second pressure sensor.

3. The pressure sensor calibration apparatus of claim 1, wherein the correlator includes a pressure/capacitance correlator, the pressure/capacitance correlator to process the capacitance value to determine a second capacitance value in a physical domain, the correlator to use the second capacitance value to determine the correlation coefficient values.

4. The pressure sensor calibration apparatus of claim 1, wherein the calibrator is to determine the calibration coefficient values to calibrate the second pressure sensor without performing physical tests on the second pressure sensor.

5. The pressure sensor calibration apparatus of claim 1, wherein the calibrator includes a re-constructor, the re-constructor to predict a second capacitance value for the second pressure sensor in a physical domain without performing physical tests on the second pressure sensor.

6. The pressure sensor calibration apparatus of claim 1, wherein the calibrator is to determine calibration coefficient values for a plurality of pressure sensors including the first pressure sensor.

7. The pressure sensor calibration apparatus of claim 1, wherein the correlator is to generate a table to associate the correlation coefficient values and the first pressure.

8. A method of calibrating a pressure sensor, comprising:
determining, by executing an instruction with at least one processor, correlation coefficient values based on a capacitance value determined during a physical test on a first pressure sensor and a first pull-in voltage value determined during a first electrical test on the first pressure sensor; and
determining, by executing an instruction with at least one processor, calibration coefficient values to calibrate a second pressure sensor based on the correlation coefficient values and a second electrical test on the second pressure sensor.

9. The method of claim 8, wherein the physical test includes exposing the first pressure sensor to a first pressure and determining the capacitance value based on the first pressure applied.

10. The method of claim 8, wherein the first electrical test includes exposing the first pressure sensor to voltages and determining the first pull-in voltage value.

11. The method of claim 8, wherein the second electrical test includes exposing the second pressure sensor to voltages and determining a second pull-in voltage of the second pressure sensor.

12. The method of claim 8, wherein the determining of the correlation coefficient values includes processing the capacitance value to determine a second capacitance value in a physical domain and using the second capacitance value to determine the correlation coefficient values.

13. The method of claim 8, wherein the determining of the calibration coefficient values includes predicting a second capacitance value for the second pressure sensor in a physical domain without performing physical tests on the second pressure sensor.

14. The method of claim 8, further including generating a table to associate the correlation coefficient values and the first pressure.

15. The method of claim 8, further including storing the calibration coefficient values on the second pressure sensor.

16. A tangible machine-readable storage disk or storage device comprising instructions which, when executed, cause a machine to at least:
determine correlation coefficient values based on a capacitance value determined during a physical test on a first pressure sensor and a first pull-in voltage value determined during a first electrical test on the first pressure sensor; and
determine calibration coefficient values to calibrate a second pressure sensor based on the correlation coefficient values and a second electrical test on the second pressure sensor.

17. The machine-readable storage disk or device of claim 16, wherein the instructions, when executed, cause the machine to store the calibration coefficient values on the second pressure sensor.

18. The machine-readable storage disk or device of claim 16, wherein the determining of the correlation coefficient values includes processing the capacitance value to determine a second capacitance value in a physical domain and using the second capacitance value to determine the correlation coefficient values.

19. The machine-readable storage disk or device of claim 16, wherein the determining of the calibration coefficient values includes predicting a second capacitance value for the second pressure sensor in a physical domain without performing physical tests on the second pressure sensor.

20. The machine-readable storage disk or device of claim 16, wherein the instructions, when executed, cause the machine to generate a table to associate the correlation coefficient values and the first pressure.

* * * * *